United States Patent
Kurtin et al.

[11] Patent Number: 6,040,947
[45] Date of Patent: Mar. 21, 2000

[54] VARIABLE SPECTACLE LENS

[75] Inventors: Stephen Kurtin; Saul Epstein, both of Sherman Oaks, Calif.

[73] Assignee: Lane Research, Sherman Oaks, Calif.

[21] Appl. No.: 09/093,991

[22] Filed: Jun. 9, 1998

[51] Int. Cl.[7] .................. G02B 1/06; G02C 7/06
[52] U.S. Cl. ................ 359/666; 351/41; 351/168
[58] Field of Search ..................... 359/665, 666, 359/667; 351/168, 172, 41

[56] References Cited

U.S. PATENT DOCUMENTS

| | | | |
|---|---|---|---|
| 3,598,479 | 8/1971 | Wright | 351/159 |
| 4,261,655 | 4/1981 | Honigsbaum | 351/41 |
| 4,913,536 | 4/1990 | Barnea | 350/419 |
| 5,138,494 | 8/1992 | Kurtin | 359/666 |
| 5,526,067 | 6/1996 | Cronin et al. | 351/41 |
| 5,684,637 | 11/1997 | Floyd | 359/666 |

FOREIGN PATENT DOCUMENTS 258325  9/1926  United Kingdom .

*Primary Examiner*—Scott J. Sugarman
*Attorney, Agent, or Firm*—Saul Epstein

[57] ABSTRACT

A liquid-filled variable focal length lens of the type which has a distensible membrane as one of the lens surfaces, and a membrane support member to support the perimeter of the free area of the membrane. By using a membrane support member having a toroidally shaped portion, the membrane is supported such that it has a circular free area irrespective of the shape of the perimeter of the lens. The cross sectional shape of the toroidal portion of the support member is preferably approximately an arc of a circle, and the perimeter of the free area of the membrane is maintained tangent thereto.

26 Claims, 1 Drawing Sheet

VARIABLE SPECTACLE LENS

BACKGROUND OF THE INVENTION

This invention relates to improvements in variable focal length lenses, especially those intended for use in spectacles. Although there are many uses for variable focal length lenses, there is a particular need as spectacle lenses. This need arises because as people get older (generally after about the age of forty five) the lens in the human eye becomes incapable of sufficient accommodation to focus on near objects. After the onset of this condition of limited focal accommodation, called presbyopia, a single set of fixed focus spectacles will be found to be unsatisfactory for both distant and near vision, irrespective of the wearer's general visual acuity. Whatever prescription (if any) may be required to correct a person's vision for distance, an additional amount of optical power (up to about three diopters) will be found to be required to correct that person's vision for near objects. The required "near addition" generally does not contain an astigmatic component, even if the wearer requires astigmatic correction for distance viewing.

Many patents have issued over the past century which disclose liquid-filled variable focus lenses. One such patent, U.S. Pat. No. 5,138,494, issued to Stephen Kurtin, discloses a variable focal length lens which includes a distensible transparent membrane spaced from a rigid lens, with the space between them filled with a liquid having a relatively high refractive index. As further disclosed in that patent, the peripheries of the rigid lens and the membrane are connected by a flexible sealing member. The rigid lens, the membrane, and the sealing member define a substantially fixed volume for the liquid filling. Changing the spacing between the membrane and the rigid lens in such a structure causes the membrane to bulge, either increasing the power of the lens or decreasing it, depending on the direction of the change in spacing. If the periphery of the membrane is circular, its distended surface will be essentially spherical, and little or no optical distortion will be encountered in use. However, for reasons of style, spectacle lens shapes other than circular are often desired. It has been found that as the lens is made more and more non-circular, the membrane form may deviate significantly from the desired spherical shape, and greater-than-desired optical distortions may be encountered.

This problem was addressed by the present inventors in U.S. Pat. No. 5,668,620, which discloses a means for assuring spherical distension of the membrane irrespective of the peripheral shape of the lens. The desired result is achieved by including a membrane support member which supports the membrane in such a way that the free (unsupported) area of the membrane is substantially circular at all times. Lenses built according to the disclosure in the '620 patent exhibit excellent optical properties, i.e., very little optical distortion is found over the needed range of optical powers. However, when such a lens is viewed by an outside observer, the line of intersection between the free area of the membrane and the membrane support member may be visible and may therefore render the lens cosmetically unpleasing. Visual contrast between the shape of the membrane surface in the region outside the membrane's free area and the shape of that surface within the free area may also contribute to cosmetic degradation.

Consequently, it is an object of the present invention to provide liquid-filled variable focus lenses of the type which have a distensible membrane supported by a membrane support member in which the intersection between the free area of the membrane and the membrane support member is visually unobvious.

It is a further object of the present invention to provide liquid-filled variable focus lenses of the type which have a distensible membrane supported by a membrane support member in which the visual contrast between the membrane's supported and unsupported surfaces is minimized.

It is yet another object of the present invention to provide liquid-filled variable focus lenses which include distensible membranes wherein optical distortion otherwise occasioned by a non-circular periphery is reduced.

Other and further objects will become evident to those skilled in the art after reading the following specification together with the attached drawings.

SUMMARY OF THE INVENTION

In a lens built according to the teachings of the '620 patent, the free portion of the membrane (i.e., the portion inside the circular opening in the membrane support member) is either flat or slightly spherical, while the portion of the membrane outside the opening may be conical and relatively steeply sloped. Both an abrupt change in slope of the membrane at the periphery of the free area of the membrane, and a difference in character of the surfaces on each side of this edge have been found to be cosmetically undesirable. The following specification discloses means for minimizing both of these undesirable characteristics. This is accomplished by shaping the surface of the membrane support member against which the membrane bears in the form of a portion of a toroid having an approximately circular cross section, and causing the perimeter of the free area of the membrane to be tangent to the surface of the support member, thereby providing a smooth transition to the free area without abrupt changes in slope.

BRIEF DESCRIPTION OF THE DRAWINGS

FIG. 2B is taken at 2—2 of FIG. 1.

DETAILED DESCRIPTION OF PREFERRED EMBODIMENTS OF THE INVENTION

Figure 1:
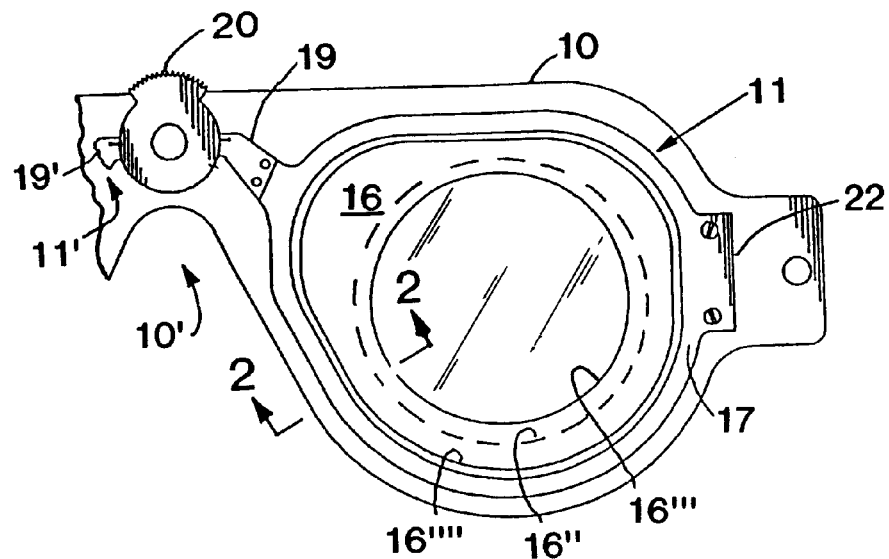
FIG. 1 is a rear view (i.e., from the wearer's side) of a portion of a pair of spectacles using lenses according to a first embodiment of the present invention.

FIG. 1 depicts a portion of a pair of spectacles which include variable focus lenses according to the present invention. The right lens is shown (the view being from the wearer's side of the spectacles), plus a small portion of the adjusting tab (19') of the left lens, sufficient to show the relationships between the parts. The following description will generally refer to only a single lens but, of course, it will be understood that there are actually two lenses in a pair of spectacles.

Although optically a single lens, a variable focus lens of the type involved in this invention can be thought of as an assembly including a fixed rigid lens plus a liquid lens which has variable power. The liquid lens is bounded on one side by the rigid lens, and on the other by a distensible transparent membrane, the space between the membrane and the rigid lens being filled with a transparent liquid. If the rigid lens is moved closer to the membrane, the membrane will distend, and become increasingly convex, thereby increasing the optical power of the liquid lens, and hence, of the lens assembly. Conversely, if the rigid lens is moved away from the membrane, the membrane will become less convex, or even concave, reducing the optical power of the assembly.

As seen in FIG. 1, the spectacles include a frame 10 to which temples (not shown) are attached. The frame is generally symmetrical about a nasal region 10'. A pair of lens assemblies 11 and 11' (a right hand and a left hand assembly) are attached to the frame 10, one on each side of the nasal region 10', using screws or other means (not shown). Only the adjusting tab 19' of the left hand assembly 11' can be seen in FIG. 1, lens assembly 11' being a mirror image of assembly 11. The lens assemblies are positioned so that the wearer's left eye sees through assembly 11', and his or her right eye sees through assembly 11.

Distensible membrane 15 is bonded to retainer 23 while under radial tension, and the resulting subassembly is bonded to front ring 14, capturing membrane support member 16 between the retainer and seal 13. The central region of the membrane support member 16, i.e., the region inboard of retainer 23, is preferably transparent. The membrane support member may have any desired peripheral shape; but irrespective of its peripheral shape, the portion 16' of its top surface against which the membrane 15 bears is toroidally shaped, i.e., it is a portion of a toroid. This portion of the support member preferably has a radially curved surface; its cross sectional shape preferably approximates an arc of a circle (having a radius R). The area of membrane 15 inboard of its line of contact 16" with membrane support member 16 (the free area of the membrane) is free to distend as described below. The convex curved toroidal shape of the top surface of membrane support member 16 results in the line of contact 16" being substantially circular, and in the membrane being maintained tangent to the toroidal surface at the line of contact. As the membrane 15 is distended to reduce the focal length of the lens assembly and thereby increase its optical power, the line of contact 16" (i.e., the line of tangency) moves outward, but remains circular. The distended free area of the membrane therefore remains spherical.

The specific value of radius R is not critical, but the preferred values fall within certain bounds for each application of the invention. The bounds for a particular application depend primarily on the amount and variation in the "land" between the line of contact 16" and the step 16"". It is preferred that the radius R be large enough so that the membrane is in contact with surface 16' at or near step 16"" at the widest land (near where tab 19 is located for the lens illustrated in FIG. 1). And preferably it should be small enough so that when the membrane is outwardly distended to its maximum, the circle defined by the line of contact 16" does not reach the step 16"" at the narrowest land (at the top for the lens illustrated in FIG. 1). For ophthalmic lenses, optimum values of R will ordinarily be found to be between about 0.2 inches and about 2 inches, but values outside these limits may be found to be desirable in some cases. The cross sectional shape of the toroidally shaped surface need not be an arc of a circle since substantial deviation from circularity can still provide the properties which make the difference in curvature between it and the free area of the membrane visually unobvious to an outside observer. Even if not an arc of a circle, the shape of the surface of the membrane support member in contact with the membrane is preferably a smooth convex curve, particularly near the line of contact 16", to achieve visual unobviousness.

A rigid lens 12 is bonded or otherwise attached to rear ring 17, which is spaced from front ring 14 by hinges 22 and actuator 20. Actuator 20 is used to change the spacing between the rigid lens 12 and the membrane 15. Since means for spacing adjustment are old and are not a part of this invention, these elements are shown only schematically in FIG. 1; more detail can be obtained by referring to application Ser. No. 08/226,334. Examples of other mechanisms for accomplishing this function can be found by referring to application Ser. No. 08/336,170 filed by the present inventors and another.

A flexible seal 13, preferably made of a durable elastomer, extends between rear ring 17 and front ring 14. The space interior of seal 13, membrane 15, and rigid lens 12 is filled with a transparent liquid 21, preferably one with an index of refraction close to that of membrane 15, rigid lens 12, and membrane support member 16, all of which preferably have the same, or nearly the same refractive index.

The view of membrane support member 16 as shown in FIG. 1 is through rigid lens 12. If, as preferred, the membrane support member, the membrane, and the transparent liquid filling, all have substantially the same index of refraction, the membrane support member will be difficult or impossible to see. For purposes of conveying a clear understanding of the preferred construction of the invention, however, the inside diameter 16"" of this element, as well as step 16"", are shown in FIG. 1 as if these details were clearly visible. The line of contact 16" between the free area of membrane 15 and the membrane support member 16 is shown as a dashed line in FIG. 1, even though it also will not be visible.

An adjusting tab 19 is attached to the rear ring 17, and extends outward from it at a point remote from the hinges. The adjusting tabs 19 and 19' (from both lenses of the spectacles, as can be seen in FIG. 1) are engaged by an actuator 20 located just above the nose of the wearer. The actuator 20 allows the wearer to adjust the distance between each front ring 14 and the corresponding rear ring 17 at points adjacent to the actuator. This causes a change in the angle between front ring 14 and rear ring 17, changing the volume between the planes of these two rings. Flexible seal 13 is constructed so that the volume change due to its motion is relatively low. Since the liquid 21 is sensibly incompressible, membrane 15, the softest member enclosing the liquid, distends as needed to enclose a fixed liquid volume. Moving the adjusting tab 19 toward the frame 10 causes the membrane 15 to bulge outward, resulting in a convex membrane surface and increased optical power.

Assuming that the index of refraction of liquid 21 is equal to that of the rigid lens 12, the optical power of the lens assembly is determined by the refractive index and the shapes of the membrane 15 and the outer (rear) surface of rigid lens 12. The shape of the interface between the liquid 21 and lens 12 will have no effect. The rear surface of rigid lens 12 is ordinarily ground so that with the adjusting tabs 19 and 19' at their rearmost position, each variable focus lens assembly will have the optical power (including any required astigmatic correction) which allows the wearer to focus on distant objects. If the wearer requires no correction for distance viewing, the rigid lens 12 may simply be a flat piece of plastic or glass (i.e., a lens of zero optical power). Rotating actuator 20 so that adjusting tabs 19 and 19' are moved closer to frame 10 causes the membrane to distend and become convex, adding to the optical power of the lens assembly so that the wearer can focus on nearer objects.

By making the membrane-supporting surface of membrane support member 16 a part of a smooth convex toroid, the perimeter of the free area of the membrane will remain substantially circular and tangent to the toroidal surface as the membrane distends. Hence, the free area of the membrane will be spherical, and optical distortions will not be introduced. At the same time, as viewed by an outside observer, the difference in shape between the free area of the membrane and the area of the membrane supported by the membrane support member will be visually unobvious.

Figure 2A:
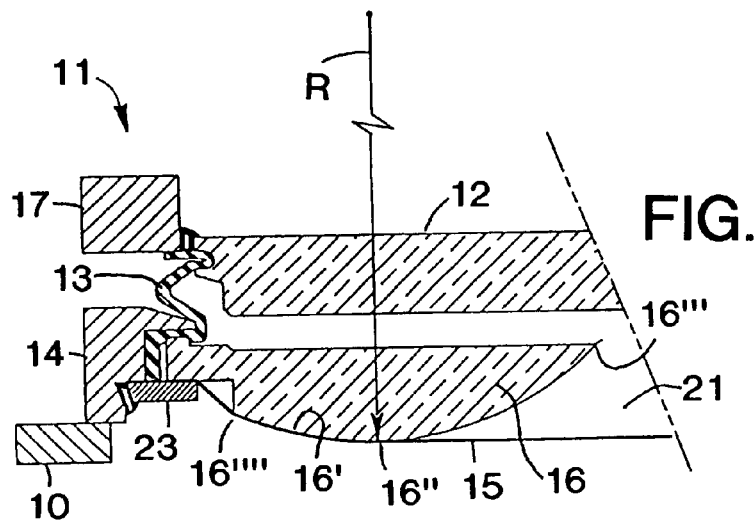
FIG. 2A is a fragmentary cross sectional view of one of the lenses of the spectacles shown in FIG. 1, taken at 2—2 of FIG. 1.
Figure 2B:
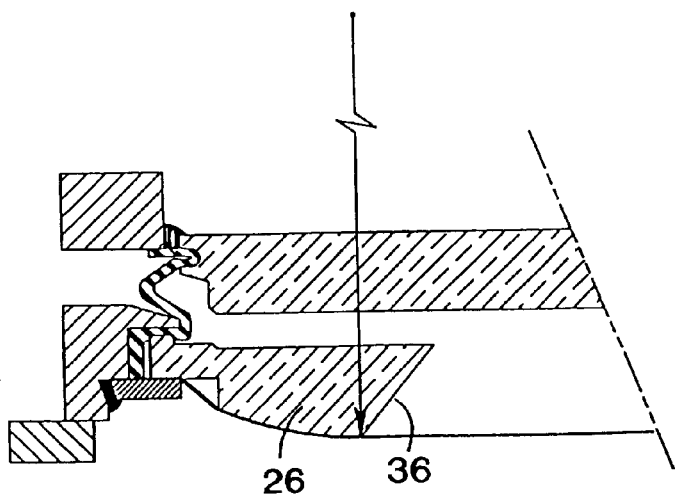
FIG. 2B is a view similar to that of FIG. 2A, but illustrating an alternative construction of the membrane support member.

FIG. 2B illustrates an alternative construction of the membrane support member. Membrane support member 26 of FIG. 2B is identical to membrane support member 16 of FIG. 2A, except that the region of the support member inboard of the innermost line of contact between the membrane and the membrane support member is cut away forming a conic surface 36. A potential benefit of this construction is that if the index match between transparent liquid 21 and membrane support member 16 is less than perfect, reflections off the surface 36 of FIG. 2B will be visible to an outside observer over a smaller range of viewing angles than reflections off the surface of the membrane support member 16 between 16" and 16'" of FIG. 2A. This is because with small index mismatches, strong reflections occur only over a narrow range of reflection angles near grazing incidence, and therefore the curved surface of the membrane support member shown in FIG. 2A gives rise to a region of strong reflections occupying a relatively larger viewing angle.

We claim:

1. A variable focal length lens which comprises:
    a rigid lens;
    a membrane support member positioned across and within the field of view of said rigid lens and spaced therefrom, said membrane support member including a toroidally shaped surface which comprises support means for supporting a transparent distensible membrane;
    a transparent distensible membrane under radial tension positioned across the field of view of said rigid lens and against said toroidally shaped surface, tension in said membrane causing said membrane to bear against said toroidially shaped surface;
    a transparent liquid filling the space between said rigid lens and said membrane;
    flexible sealing means for retaining said transparent liquid between said rigid lens and said membrane; and
    variable spacing means for adjusting the spacing between said membrane support member and said rigid lens.

2. A variable focal length lens as recited in claim 1 wherein said toroidally shaped surface has a cross sectional shape which is a smooth convex curve.

3. A variable focal length lens as recited in claim 2 wherein said smooth convex curve is substantially an arc of a circle.

4. A variable focal length lens as recited in claim 3 where the radius of said arc is between about 0.2 inches and about 2 inches.

5. A variable focal length lens as recited in claim 1 where a central region of said membrane support member is transparent and has substantially the same refractive index as said transparent liquid.

6. A variable focal length lens as recited in claim 1 wherein said membrane support member and said rigid lens are hingedly connected and said variable spacing means acts to change the space between said membrane support member and said rigid lens at points remote from said hinge.

7. A variable focal length lens as recited in claim 6 wherein said toroidally shaped surface has a cross sectional shape which is a smooth convex curve.

8. A variable focal length lens as recited in claim 7 wherein said smooth convex curve is substantially an arc of a circle.

9. A variable focal length lens as recited in claim 8 where the radius of said arc is between about 0.2 inches and about 2 inches.

10. A variable focal length lens which comprises:
    a rigid lens;
    a membrane support member positioned across and within the field of view of said rigid lens and spaced therefrom, said membrane support member including a membrane-supporting surface;
    variable spacing means for adjusting the spacing between said membrane support member and said rigid lens between a first spacing and a second spacing;
    a transparent distensible membrane positioned across the field of view of said rigid lens and having a first area in contact with said membrane supporting surface, and a second area free of said membrane supporting surface, the perimeter of said second area being tangent to said membrane supporting surface at all spacings between said first spacing and said second spacing;
    a transparent liquid filling the space between said rigid lens and said membrane; and
    flexible sealing means for retaining said transparent liquid between said rigid lens and said membrane.

11. A variable focal length lens as recited in claim 10 wherein said membrane supporting surface is toroidal and has a cross sectional shape which is a smooth convex curve.

12. A variable focal length lens as recited in claim 11 wherein said smooth convex surface is substantially an arc of a circle.

13. A variable focal length lens as recited in claim 12 where the radius of said arc is between about 0.2 inches and about 2 inches.

14. A variable focal length lens as recited in claim 10 where a central region of said membrane support member has substantially the same refractive index as said transparent liquid.

15. A variable focal length lens as recited in claim 10 wherein said membrane support member and said rigid lens are hingedly connected and said variable spacing means acts to change the space between said membrane support member and said rigid lens at points remote from said hinge.

16. A variable focal length lens as recited in claim 15 wherein said membrane supporting surface is toroidal and has a cross sectional shape which is a smooth convex curve.

17. A variable focal length lens as recited in claim 16 wherein said smooth convex curve is substantially an arc of a circle.

18. A variable focal length lens as recited in claim 17 where the radius of said arc is between about 0.2 inches and about 2 inches.

19. A variable focal length lens which comprises:
    a rigid lens;
    a membrane support member positioned across and within the field of view of said rigid lens and spaced therefrom, said membrane support member including a radially curved surface which comprises support means for supporting a transparent distensible membrane;
    a transparent distensible membrane positioned across the field of view of said rigid lens and against said radially curved surface, said transparent distensible membrane being in contact with said radially curved surface at all spacings between said membrane support member and said rigid lens;

a transparent liquid filling the space between said rigid lens and said membrane;

flexible sealing means for retaining said transparent liquid between said rigid lens and said membrane; and variable spacing means for adjusting the spacing between said membrane support member and said rigid lens.

20. A variable focal length lens as recited in claim 19 wherein said radially curved surface has a radial shape which is a smooth convex curve.

21. A variable focal length lens as recited in claim 20 wherein said smooth convex curve is substantially an arc of a circle.

22. A variable focal length lens as recited in claim 21 where the radius of said arc is between about 0.2 inches and about 2 inches.

23. A variable focal length lens as recited in claim 19 wherein said membrane support member and said rigid lens are hingedly connected and said variable spacing means acts to change the space between said membrane support member and said rigid lens at points remote from said hinge.

24. A variable focal length lens as recited in claim 23 wherein said radially curved surface has a radial shape which is a smooth convex curve.

25. A variable focal length lens as recited in claim 24 wherein said smooth convex curve is substantially an arc of a circle.

26. A variable focal length lens as recited in claim 25 where the radius of said arc is between about 0.2 inches and about 2 inches.

* * * * *